US008725509B1

(12) United States Patent
Harb et al.

(10) Patent No.: US 8,725,509 B1
(45) Date of Patent: May 13, 2014

(54) BACK-OFF LANGUAGE MODEL COMPRESSION

(75) Inventors: Boulos Harb, New Haven, CT (US);
Ciprian Chelba, Palo Alto, CA (US);
Jeffrey A. Dean, Palo Alto, CA (US);
Sanjay Ghemawat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1097 days.

(21) Appl. No.: 12/486,358

(22) Filed: Jun. 17, 2009

(51) Int. Cl.
*G10L 15/00* (2013.01)
*G10L 15/06* (2013.01)
*G10L 15/28* (2013.01)
*G06F 17/21* (2006.01)

(52) U.S. Cl.
USPC ............................. 704/255; 704/10; 704/244

(58) Field of Classification Search
USPC .......................................................... 704/10
See application file for complete search history.

(56) References Cited

U.S. PATENT DOCUMENTS

| | | | | |
|---|---|---|---|---|
| 4,730,348 A * | 3/1988 | MacCrisken | ................. | 375/240 |
| 5,506,580 A * | 4/1996 | Whiting et al. | ................. | 341/51 |
| 5,532,694 A * | 7/1996 | Mayers et al. | ................. | 341/67 |
| 5,839,100 A * | 11/1998 | Wegener | ................. | 704/220 |
| 5,966,709 A * | 10/1999 | Zhang et al. | ................. | 1/1 |
| 6,272,456 B1 * | 8/2001 | de Campos | ................. | 704/8 |
| 6,668,243 B1 * | 12/2003 | Odell | ................. | 704/243 |
| 7,031,910 B2 * | 4/2006 | Eisele | ................. | 704/10 |
| 7,778,837 B2 * | 8/2010 | Thiesson et al. | ................. | 704/278 |
| 7,877,258 B1 * | 1/2011 | Chelba et al. | ................. | 704/257 |
| 8,209,178 B1 * | 6/2012 | Talbot et al. | ................. | 704/255 |
| 2001/0051868 A1 * | 12/2001 | Witschel | ................. | 704/9 |
| 2004/0138884 A1 * | 7/2004 | Whittaker et al. | ................. | 704/236 |
| 2005/0055199 A1 * | 3/2005 | Ryzchachkin et al. | ................. | 704/4 |
| 2006/0053015 A1 * | 3/2006 | Lai et al. | ................. | 704/257 |
| 2006/0293899 A1 * | 12/2006 | Church et al. | ................. | 704/275 |
| 2007/0078653 A1 * | 4/2007 | Olsen | ................. | 704/240 |
| 2007/0219779 A1 * | 9/2007 | Kojima | ................. | 704/9 |
| 2008/0262828 A1 * | 10/2008 | Och et al. | ................. | 704/3 |

OTHER PUBLICATIONS

Williams et al, "Compressing integers for fast file access", The Computer Journal, 42(3):193-201.*
Cui et al, "Investigating linguistic knowledge in a maximum entropy token-based language model," Dec. 2007, Automatic Speech Recognition & Understanding. ASRU. IEEE Workshop on , vol. No. pp. 171-176.*
Hsu "Iterative language model estimation: efficient data structure and algorithms", 2008, in Proc. InterSpeech-2008, Brisbane, Australia, pp. 1-4.*

(Continued)

*Primary Examiner* — Richemond Dorvil
*Assistant Examiner* — Olujimi Adesanya
(74) *Attorney, Agent, or Firm* — Remarck Law Group PLC

(57) ABSTRACT

Methods, systems, and apparatus, including computer programs encoded on a computer storage medium, relating to language models stored for digital language processing. In one aspect, a method includes the actions of generating a language model, including: receiving a collection of n-grams from a corpus, each n-gram of the collection having a corresponding first probability of occurring in the corpus, and generating a trie representing the collection of n-grams, the trie being represented using one or more arrays of integers, and compressing an array representation of the trie using block encoding; and using the language model to identify a second probability of a particular string of words occurring.

18 Claims, 5 Drawing Sheets

(56) References Cited

OTHER PUBLICATIONS

Raj et al, "Lossless compression of language model structure and word identifiers," Acoustics, Speech, and Signal Processing, 2003. Proceedings. (ICASSP '03). 2003 IEEE International Conference on , vol. 1, No., pp. I-388-I-391 vol. 1, 6-10.*

Brants et al, "Large Language Models in Machine Translation", Jun. 2007, In Proceedings of the 2007 Joint Conference on Empirical Methods in Natural Language Processing and Computational Natural Language Learning, Prague, pp. 858-867.*

Dean et al, "Mapreduce: simplified data processing on large cluster", 2004, In OSDI'04: Proceedings of the 6th conference on Symposium on Opearting Systems Design & Implementation (Berkeley, CA, USA, 2004), USENIX Association, pp. 1-10.*

Wu et al, "Reducing Language model size by Importance-based pruning and rank-Based Quantization", 2003, Oriental-COCSOSDA, Sentosa, Singapore, pp. 156-159.*

\* cited by examiner

United States Patent US 8,725,509 B1

BACK-OFF LANGUAGE MODEL COMPRESSION

BACKGROUND

This specification relates to language models stored for digital language processing.

Language models are used to model a probability that a string of words in a given vocabulary will appear in a language. For example, language models are used in automatic speech recognition, machine translation, and optical character recognition applications. Modeling the probability for a string of words in the vocabulary is typically performed using a chain rule and calculating the probability of a given word, w, in a given string context, p(w|context), where the context is the words in the string preceding the given word, w.

In an n-gram language model, the words in the vocabulary are formed into n-grams. An n-gram is a sequence of n consecutive tokens, which in the present specification are typically words. An n-gram has an order, which is the number of words in the n-gram. For example, a 1-gram (or unigram) include one word; a 2-gram (or bi-gram) includes two words.

A given n-gram can be described according to different portions of the n-gram. An n-gram can be described as a context and a future word, (context, w), where the context has a length n−1 and w represents the future word. For example, the 3-gram "the black sheep" can be described in terms of an n-gram context and a future word. The n-gram context includes all words of the n-gram preceding the last word of the n-gram. In the given example, "the black" is the context. The left most word in the context is referred to as the left word. The future word is the last word of the n-gram, which in the example is "sheep". The n-gram can also be described with respect to a right context and a backed off context. The right context, also referred to as a "back-off n-gram", includes all words of the n-gram following the first word of the n-gram, represented as a (n−1)-gram. In the example above, "black sheep" is the right context. Additionally, the backed off context is the context of the n-gram less the left most word in the context. In the example above, "black" is the backed off context.

The probability according to the n-gram language model that a particular string will occur can be determined using the chain rule. The chain rule determines a probability of a string as a product of individual probabilities. Thus for a given string "$e_1, e_2, \ldots, e_k$", the probability for the string, $p(e_1, e_2, \ldots, e_k)$, is equal to:

$$\prod_{i=1}^{k} p(e_i | e_1, \ldots, e_{i-1})$$

The n-gram language model can be limited to a particular maximum size n-gram, e.g., limited to 1-grams, 2-grams, 3-grams, etc. For example, for a given string "NASA officials say they hope," where the maximum n-gram order is limited to 3-grams, the probability for the string can be determined as a product of conditional probabilities as follows: p(NASA officials say they hope)=p(NASA)×p(officials|NASA)×p(say|NASA officials)×p(they|officials say)×p(hope|say they). This can be generalized to:

$$p(e_1, \ldots, e_k) = \prod_{i=1}^{k} p(e_i | e_{i-n+1}, \ldots, e_{i-1})$$

where n is the order of the largest n-gram allowed in the language model.

Sentences are considered independently (bounded by sentence beginning and end markers, <s> and </s> respectively. The sentence independence constraint translates to predicting the first words in the sentence from the boundary symbols, but not words in the previous sentence. For the example, NASA is predicted using P(NASA|<s> </s>). The end of sentence marker is predicted as well to make sure we deal with a proper probability model.

The conditional probabilities are generally determined empirically, according to relative frequencies in a corpus of text. For example, in the example above, the probability of the word "say" given the context of "NASA officials" is given by:

$$p(\text{say} | NASA \text{ officials}) = \frac{f(NASA \text{ officials say})}{f(NASA \text{ officials})},$$

where f (NASA officials say) is a frequency or a count of the occurrences of the string "NASA officials say" in the corpus. Conditional probabilities for strings within the maximum n-gram order in the n-gram language model correspond to the probability stored in the language model for the n-gram, e.g., p(say|NASA officials) is the conditional probability stored in the language model for the 3-gram entry "NASA officials say". A back off weight can optionally be determined for n-grams having an order less than the maximum order. The back off weight ("BOW") is a factor applied to estimate the probability for a particular n-gram when it is not found in the model.

SUMMARY

This specification describes technologies relating to language models stored for digital language processing.

In general, one aspect of the subject matter described in this specification can be embodied in methods that include the actions of generating a language model, including: receiving a collection of n-grams from a corpus, each n-gram of the collection having a corresponding first probability of occurring in the corpus, and generating a trie representing the collection of n-grams, the trie being represented using one or more arrays of integers, and compressing an array representation of the trie using block encoding; and using the language model to identify a second probability of a particular string of words occurring. Other embodiments of this aspect include corresponding systems, apparatus, and computer program products.

These and other embodiments can optionally include one or more of the following features. The compressing includes dividing the array into two or more non-overlapping blocks; encoding each block according to a particular encoding; and storing the sequence of encoded blocks. The method further includes generating an offset array, the offset array mapping the block numbers to the beginning of the corresponding encoded block. The method further includes performing random access encoding, the encoding including, for each block: encoding an anchor for the block, where the anchor corresponds to a first value in the block; and encoding the difference between each subsequent element in the block and the anchor. The method further includes encoding the integer values of the blocks including combining two or more integer values in a single group representation.

The method further includes calculating a Huffman code for the array; performing a first encoding pass of the blocks using the Huffman code, the first encoding converting integer values in the array to one of one or more specified symbols having a count value incremented for each encoding of the symbol; building a Huffman table from the encoding; performing one or more subsequent encoding passes of the blocks using the Huffman table from the previous encoding pass to generate a new count distribution for the one or more specified symbols; and encoding the values for the array using a last generated Huffman table. Using the language model includes looking up an n-gram key including: computing a block number; looking up a block offset; decoding the entry in the block corresponding to the block offset; and looking up the corresponding probability or back-off weight associated with the n-gram.

Generating the trie includes: calculating a rightmost word vector and a right diversity vector using the collection of n-grams, the rightmost word vector identifying each distinct right word for a given left context in the collection, the right diversity vector identifying a count of distinct right words for each left context in the collection. The method further includes representing entries in the rightmost word vector and right diversity vector as integers.

Particular embodiments of the subject matter described in this specification can be implemented so as to realize one or more of the following advantages. A compressed representation of a language model reduces storage space while providing fast lookup access. Additionally, the reduced size of the language model representation allows the language model to be loaded quickly and also allows multiple language models to be efficiently stored in memory and used concurrently. Furthermore, a reduced size language model with efficient lookup can allow quick voice recognition processing for received verbal queries, e.g., for use in performing searching.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
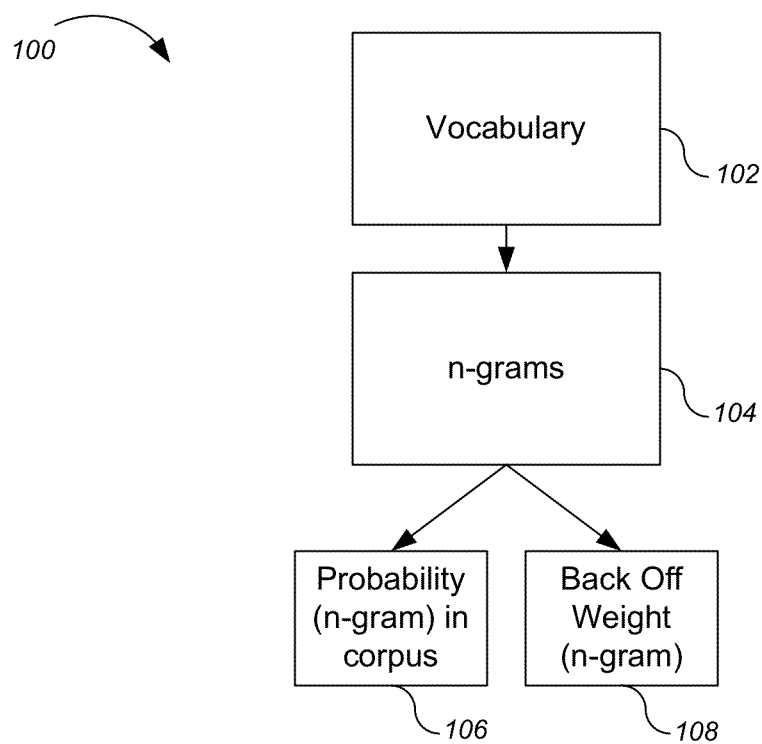
FIG. 1 is a block diagram illustrating example components for building a language model.

FIG. 1 is a block diagram illustrating components for building a language model 100. The language model 100 includes a vocabulary 102 and a collection of n-grams 104.

The vocabulary 102 is a collection of distinct words found in a corpus of text used to train the language model. The corpus can include a number of different sources of text, including, e.g., web pages and news articles. In some implementations, the corpus includes text on the order of tens to hundreds of billions of words, or even more. One such corpus is the Linguistic Data Consortium ("LDC") Web 1T 5-gram Version 1 corpus, LDC Catalog No.: DC2006T13, ISBN: 1-58563-397-6, contributed by Google™ Inc. In this corpus, the length of the n-grams ranges from unigrams (single words) to five-grams, and each n-gram has an n-gram count generated from approximately one trillion word tokens (including individual words, punctuation, markers identifying a beginning and end of individual sentences) of text from publicly accessible Web pages. In general, the corpus can be a single language or can include several languages, e.g., for machine translation applications, for which a language model can be built for each language. For example, a sample corpus could include texts of 200 billion English words, 88 billion Chinese words, and 30 billion German words.

The words in the vocabulary 102 are used to form n-grams 104. The n-grams can be stored, for example, in an n-gram table. The maximum order of the n-grams can be specified. For example, if the model has a maximum order of five, the collection of n-grams would include all occurring 1-grams, 2-grams, 3-grams, 4-grams, and 5-grams. The number of n-grams can be reduced by mapping rare words to a single "unknown word" placeholder, e.g., "<UNK>", in the n-grams. A rare word is one that occurs very infrequently in the corpus, for example, with a frequency of less than once per five billion words of text. Thus, some multiple n-gram entries can be reduced to a single n-gram entry. For example, the n-gram "word-A word-B RareWord1 word-C word-D" and the n-gram "word-A word-B RareWord2 word-C word-D" can both be mapped to the n-gram "word-A word-B<UNK> word-C word-D".

Each n-gram stored in the language model 100 has an associated probability 106. The probability 106 is the conditional probability of each n-gram according to a frequency in which the n-gram occurs in the corpus.

A back-off weight can optionally be determined for n-grams having an order less than the maximum order. For example, for an n-gram language model having a maximum order of three, back-off weights can be determined for each 1-gram and 2-gram. The back-off weight ("BOW") is a factor applied to estimate the probability for an n-gram when it is not found in the collection of n-grams 106. For example, if a particular 3-gram (word 1, word 2, word 3) is not found in the collection of n-grams 106, the probability of the third word given the first and second word of the n-gram, p(word 3|word 1 word 2) can still be determined. The probability can be determined as a function of the BOW and a probability for the third word of the n-gram given the second word, p(word 3|word 2), such that p(word 3|word 1 word 2)=BOW(word 1 word 2) p(word 3|word 2). The BOW can be determined, for example, according to the probability associated with the context of the given n-gram in the corpus in order to assess a likelihood that word 1 will be followed by word 2.

For example, if the n-gram "the black sheep" is not found in the language model, its probability can still be determined. The probability for the full n-gram "the black sheep" is equal to the probability of "sheep" given "black" (e.g., p(sheep|black), i.e., the probability of the n-gram "black sheep", multiplied by the BOW for the n-gram "the black."

The rule is applied recursively. For example, if p(sheep|black) is not explicitly stored in the model, it is calculated as p(sheep|black)=BOW(black) p(sheep). The recursion terminates at n-gram order=1.

In some implementations, the language model includes a table that includes n-grams and their respective probabilities and back-off weights, where applicable. The table can be used to identify the probability of a given string (e.g., one received to be tested against the language model) using the n-grams of the string. The string can include words, punctuation, and other text. Additionally, the string can include other information identifying a sentence beginning, a sentence end, and other information about the contents of the string. Additionally, using the back-off weights, the language model can be used to determine a probability for an n-gram that is not found in the corpus. This type of language model can be referred to as a back-off n-gram language model.

The language model for a corpus can be very large. In some implementations, the language model is built using distributed processing. For example, when building the language model, the raw data of the corpus can be separated into a number of different parts by sharding the corpus. Sharding refers to the process of separating a large data set into smaller pieces. A sharding function applies a unique shard identifier to chunks of data in the corpus, splitting the large data set into a number of disjoint subsets. There can be redundancy in the data contained within shards, for example, for efficiency or to protect against hardware failures for a particular shard.

The data forming the language model can be distributed, for example, according to the Google™ File System (GFS). The GFS architecture includes a GFS cluster having a single master and multiple "chunkservers". Files are divided into fixed size chunks, which are uniquely identified by the master and stored on a particular chunkserver. Each chunk can be replicated on multiple chunkservers. The master includes file system metadata. This includes namespace, access control information, mapping from files to chunks, and locations of chunks. Additional information about GFS can be found in Ghemawat et al., "The Google File System", Symposium on Operating System Principles, Oct. 19-20, 2003.

In some implementations, the data contained in each shard is processed in parallel to identify words including sentence beginning ("<s>") and end ("</s>") marker. The processed information can be used when generating the vocabulary for the language model, which includes sentence markers as words, as will be described below. For example, a MapReduce process can be undertaken to process the data.

The term MapReduce describes both a programming model and an implementation of the model for processing and generating large data sets. The model and its library implementation will both be referred to as MapReduce. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter-machine communication.

Additional details of MapReduce are described in J. Dean and S. Ghemawat, *MapReduce: Simplified Data Processing on Large Clusters*, Proceedings of the 6th Symposium on Operating Systems Design and Implementation, pp. 137 150 (Dec. 6, 2004).

The parallelization processing using MapReduce can also be used to identify n-gram frequencies within the corpus. The Map phase can process the corpus shards in view of the vocabulary. The Reduce phase combines n-grams such that the output (key, value) pairs are (n-gram, frequency) pairs.

The relative frequency of n-grams in the corpus can also be identified using MapReduce. For example, n-grams can be divided into a number of shards. The input of n-grams and frequencies can be processed in the Map and Reduce phases to produce relative frequencies for the n-grams in a similar manner as describe above.

To summarize, a language model can be generated from a corpus in the following steps. The system generates a vocabulary. Using input text from the corpus, the system outputs a vocabulary of 1-grams and their frequencies. Next, n-grams and their frequencies are identified. The n-grams and their frequencies are identified using the text and vocabulary as input. Relative frequencies for the n-grams are calculated using the n-grams and their respective frequencies. Each step in the process can be implemented using MapReduce as described above.

The language model 100 can be encoded as data blocks according to an Advanced Research Projects Agency ("ARPA") Language Model format. The ARPA format organizes the n-grams in the vocabulary according to n-gram order (1-grams, 2-grams, . . . , n-grams). Additionally, for each order, the ARPA format identifies a probability for each n-gram, the n-gram, and the BOW for each n-gram having an order less than the maximum order. Thus, at the highest order, only the probability of the n-gram and the n-gram are listed in an n-gram table. The listing of 1-grams provides the ordering of words in the language model vocabulary. The listing of 1-grams, therefore, also corresponds to the vocabulary of the language model.

Back-off n-gram models satisfy the following constraint: if a particular n-gram (context, w) is represented explicitly in the model, its context must also be represented as an n-gram of length n−1, at an immediately lower order in the model, in order to store the back-off weight for the context. In some implementations, constraint can be side-stepped using approximations to the language model that assign a constant back-off weight, independent of the n-gram context. Such approximations do not generate proper probabilistic models, however they can reduce the size of the model.

This constraint is particularly important in an integer-trie language model representation: each n-gram context has already been seen, and assigned an integer key, which is used to identify a diversity counter entry for the context, and to count the different n-grams (context, w), as described in greater detail below.

Figure 2:
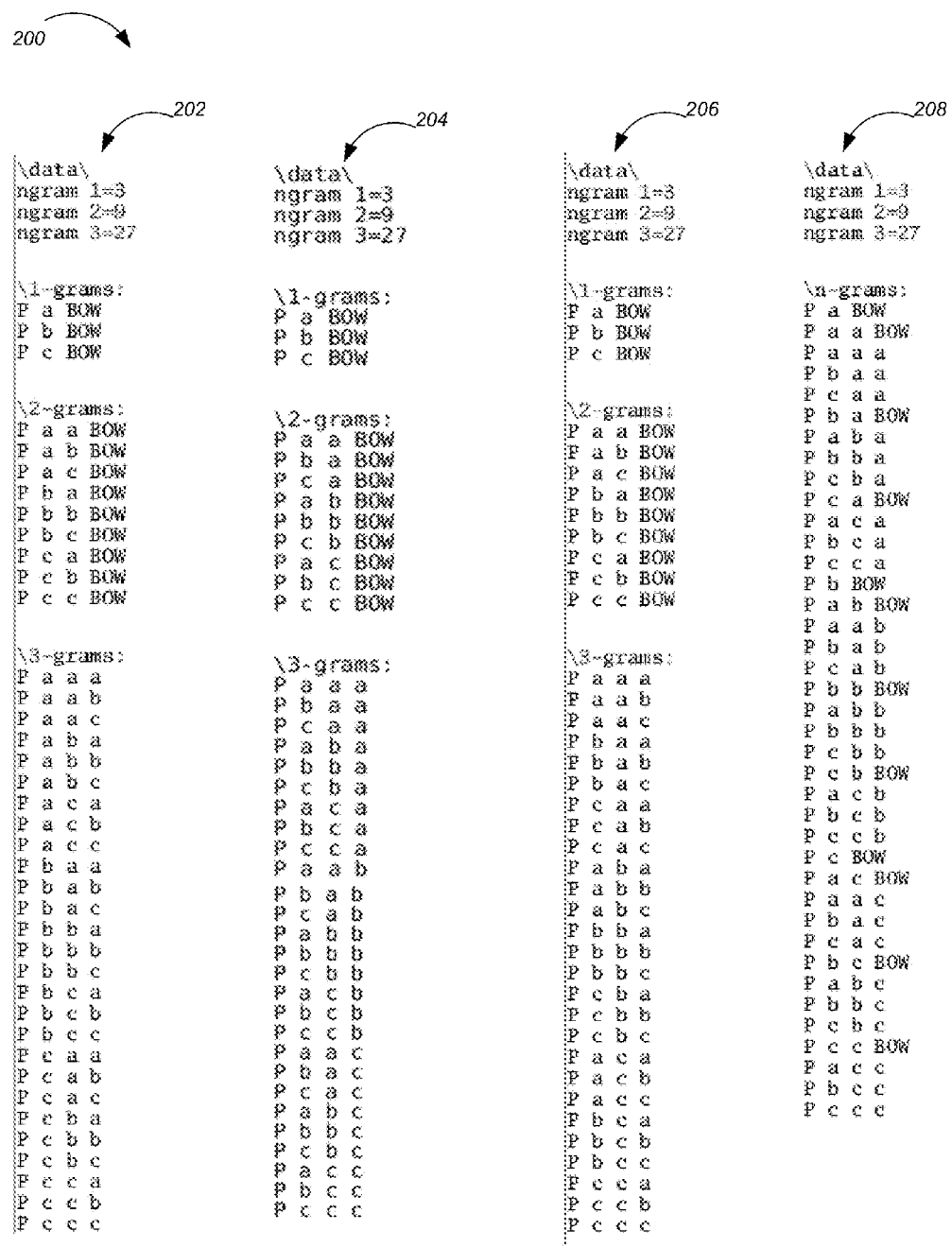
FIG. 2 shows example n-gram sorting techniques.

The n-grams represented by the language model can be sorted according to different criteria. FIG. 2 shows example n-gram sorting techniques 200. The n-gram sorting techniques 200 are shown for a simplified vocabulary of three words: a, b, c.

A first sorting technique is a direct full n-gram sort 202. The direct full n-gram sort 202 lists n-grams in direct traversal order from the left-most word to the right-most word. Thus, as shown in the direct full n-gram sort 202, for each order of n-gram, the possible combinations of words for each n-gram are organized such that the rightmost word is changed most frequently, while the leftmost word stays the same for every possible n-gram beginning with that word. For example, for 2-grams, the left word "a" is the same for each possible right word (e.g., a a; a b; a c).

A second sorting technique is a reversed full n-gram sort 204. The reversed full n-gram sort 204 is similar to the direct full n-gram sort 202, except that the n-grams are listed in reverse traversal order from the right-most word to the left-most word. Thus, as shown in the reversed full n-gram sort 204, for each order of n-gram, the possible combinations of words for each n-gram are organized such that the leftmost word is changed most frequently, while the rightmost word stays the same for every possible n-gram ending with that word. For example, for 2-grams, the right word "a" is the same for each possible right word (e.g., a a; b a; c a).

A third sorting technique is a reversed context n-gram sort 206. In the reversed context n-gram sort 206, the context is first sorted in reverse traversal order from the right-most word to the left-most word. Then the future word is sorted within the same context. For example, in the 3 grams for the reversed context n-gram sort 206, the first two words represent the context for the 3-gram. They are each sorted in reverse traversal order, e.g., a a; b a; c a. The third word of the 3-gram is the future word. For each possible context, each future word is listed. For example, for the context (a a), there are three different future words sorted in vocabulary order: (a a a; a a b; a a c).

A fourth sorting technique is a combined reversed full n-gram sort 208. In the combined reversed full n-gram sort 208, the 1-grams, 2-grams, and 3-grams are combined into a single list. Shorter n-grams occur in the list before longer n-grams that share the same words (e.g., a; a a; a a a). A combined sort can be used with the other sorting techniques described above (e.g., a combined direct full n-gram sort, a combined reversed context n-gram sort). However, the combined sort is not a standard ARPA language model representation, because the ARPA language model representations requires separation of n-grams according to n-gram order. Any of the sorting schemes can be used to generate an integer-trie representation of the language model given proper nesting constraints.

Figure 3:
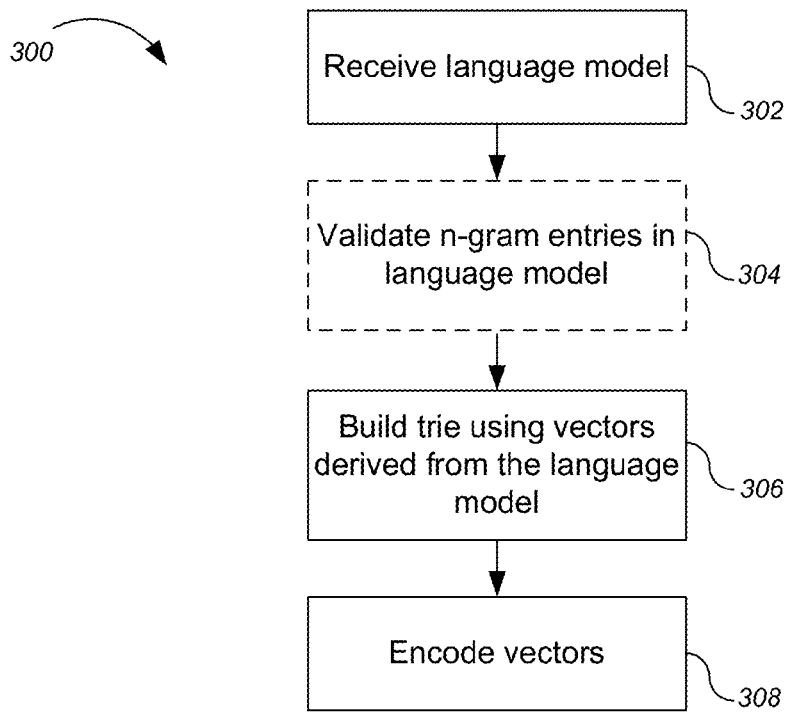
FIG. 3 is a flowchart illustrating an example method for encoding a language model using a trie.

FIG. 3 shows a flowchart illustrating a method 300 for encoding a language model using a tie structure. For convenience, the method 300 will be described with reference to a system that performs the method 300. The system receives a language model (step 302). The received language model includes a collection of n-grams and associated probabilities as described above. Additionally, the received language model can also include back-off weights for each n-gram of less than maximum order.

In some implementations, the system receives a corpus for building the language model. The system uses the corpus to determine a collection of n-grams and associated probabilities and back-off weights to build a language model as described above.

The system can optionally validate the collection of n-grams in the language model (step 304). For example, an optional constraint can be applied such that whenever any n-gram is present in the language model, the right context for the n-gram must also be present at the next lower n-gram order. For example, if the 3-gram entry is "the black sheep", there can optionally be a requirement that the language model include an entry for the right context "black sheep" in the 2-gram section. This constraint is referred to as a "gradual back-off" constraint. If the received language model does not satisfy the gradual back-off constraint, n-gram entries can be added to the language model so that the constraint is satisfied.

In some implementations, the language model also satisfies a left nesting constraint. The left nesting constraint provides that for every n-gram entry (context, w), the context must be present as an n-gram in the language model, e.g., for "the black sheep", "the black" must be a 2-gram entry as well. However, in some alternative implementations, the language model need not be properly normalized such that the constraint is not necessary.

In some implementations, a preprocessing pass is applied to the language model in order to add missing context n-grams. A probability is assigned to each added context entry as p(context)=BOW(context of context)×p(right context of context). The back-off weight of the context entry can be assigned a value of 1.0. Additionally, the BOW(context of context) can also be assigned a value of 1.0, if it does not already occur in the language model.

In other implementations, a combined sort is used to insert missing n-grams on the fly as the n-grams of the language model are scanned during validation. The back-off weights for added entries can again be assigned a value of 1.0. The probability for the added entries can initially be given a value as undefined such that an additional processing is performed at runtime. Alternatively, an additional post-processing pass can be performed that enters the probability as p(added n-gram)=BOW(context of context)×p(right context of context). In this case, the probability cannot be calculated on the fly because the context of context may occur later in the combined sort for the n-grams in the language model.

Using the combined reversed full n-gram sort, missing n-grams can quickly be identified. For example, if the 2-gram "b c" is missing, this is detected when the 3-gram "a b c" is identified in the language model. In the combined reversed full n-gram sort, the missing 2-gram "b c" should have occurred immediately prior to the 3-gram "a b c". Thus, the missing 2-gram can be inserted on the fly prior to "a b c". More generally, any missing right context should appear as a separate entry immediately before it appears in a larger order n-gram. The insertion can be recursive. For example, if both "b c" and "c" are missing, they can both be inserted when "a b c" is encountered.

The system builds a trie structure using vectors derived from the language model (step 306). A trie is an ordered tree data structure. The trie includes nodes corresponding to words. Specifically, the trie structure identifies key values that correspond to strings (e.g., n-grams). Each node in the trie has a position identifying what key the node is associated with. The descendants of a given node have a common prefix of the string. It is possible to represent the trie storing the n-gram skeleton using two vectors of integers, hence the name integer-trie. The trie also assigns a 1:1 mapping between consecutive integer values [0, N−1] and the n-grams in the language model, with N being the total number of n-grams in the model. The vectors are used to define the ordered tree data structure of the trie such that the vectors can be used to identify keys corresponding to particular n-grams. Additionally, the vectors can be constructed such that only incremental data is added to each vector whenever a new n-gram is scanned, thus making the language model representation very compact.

Figure 4:
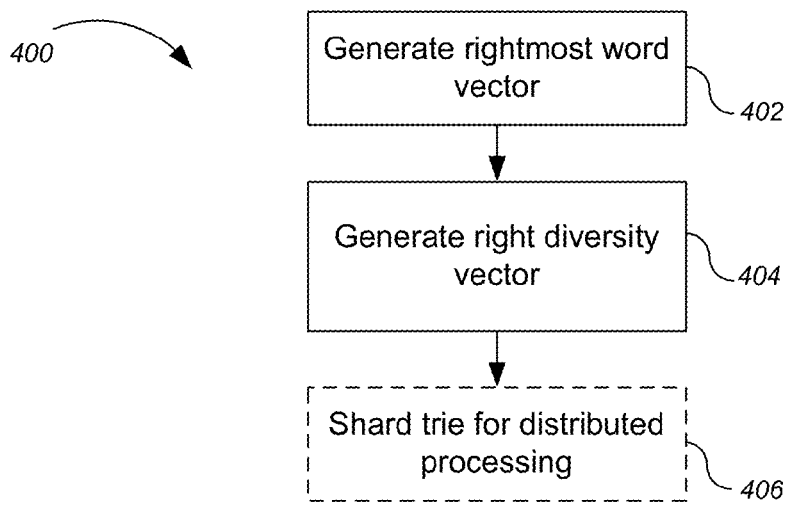
FIG. 4 is a flowchart illustrating an example method for building a trie for a language model skeleton using two vectors.

FIG. 4 is a flowchart illustrating an example method 400 for building a trie for a language model skeleton using two vectors. The language model includes a skeleton and a payload. The skeleton for a back-off n-gram language model corresponds to the set of n-grams stored in the language model. The payload of the language model is the probability and back-off weights stored for the n-grams. For example, the probabilities for particular n-grams occurring can be stored as a probability or as a log-probability. The trie is built by generating two vectors from the language model, specifically, a rightmost word ("rmw") vector and a right diversity ("div") vector.

The system generates 402 the rightmost word vector. The rightmost word vector identifies words as integers and has a length equal to the number of n-grams in the language model. The system adds each new right word seen in a given context to the rightmost word vector as the system traverses the list of n-grams sorted by order and by n-gram (e.g., a direct full n-gram sort).

The system generates 404 the right diversity vector. The right diversity vector is indexed by the integer key assigned to a given context. The right diversity vector stores the number of different right words seen in a given context (e.g., future words in a given n-gram context). Each entry in the right diversity vector corresponds to a count. The count of each entry represents a number of different rightmost words for a given context.

The system does not store a diversity count for the highest order n-grams, which have diversity 0 since the largest order n-grams are never the context of another n-gram. Thus, the number of entries in the right diversity vector is specified as the number of n-grams less the number of n-grams at maximum order (e.g., if there are 20 separate n-grams and 3 n-grams at maximum order, the number of entries in the right diversity vector is 17).

In some implementations, the two vectors are generated as follows. For each n-gram in the language model, the rightmost word of the n-gram is appended to the rightmost word vector. The diversity counter of the right diversity vector corresponding to the context of the n-gram is incremented. Thus, the diversity counter counts the number of different future words (e.g., rightmost words) for a given context. Each n-gram receives as its integer key the index of its right word as the rightmost word vector is generated.

For example, consider the following two sentences:
<s> the car <UNK> </s>, and
<s> a <UNK> </s>,
where <s> represents the beginning of a sentence, </s> represents the end of a sentence, and <UNK> represents a rare word. In particular, when generating a language model text is segmented into sentences that are assumed to be independent. Each sentence is then embedded in sentence boundary markers (sentence beginning and end, <s> and </s> respectively). The direct full n-gram sort provides the following sorting in the language model:
1-grams: 6
<s>
</s>
<UNK>
a
car
the
2-grams: 6
<s> the
<s> a
the car
car <UNK>
<UNK> </s>
a <UNK>
3-grams: 5
<s> the car
<s> a <UNK>
the car <UNK>
car <UNK> </s>
a <UNK> </s>
4-grams: 3
<s> the car <UNK>
the car <UNK> </s>
<s> a <UNK> </s>

The generated vectors forming the trie structure are:
Rightmost word vector=<s>_</s>_<UNK>_a_car_the_a_car_<UNK>_</s>_<UNK>_car_<UNK>_<UNK>_</s>_</s>
Right diversity vector=2_0_1_1_1_1_1_1_1_1_0_1_1_1_1_0_0.

While the rightmost word vector is illustrated with the right words added to the rightmost vector for clarity, the vector can be represented with corresponding integer values. There are 20 entries in the rightmost word vector corresponding to the 20 distinct n-grams in the sample language model.

The entries of the right diversity vector are zero initially (i.e., empty counters). The values are incremented according to the following process. The rightmost word vector is initially built with each 1-gram of the vocabulary in the order given by the language model. These 1-grams do not have contexts, so they do not affect the right diversity vector. Beginning with the 2-grams in the language model, the first six entries (i.e., corresponding to the number of words in the vocabulary) in the right diversity vector, the number of different right words in each context is counted.

For example, the first entry counts the diversity in context <s>, which is the first word in the vocabulary. The value is 2 because there are two different rightmost words having the context <s>. The second entry counts the diversity in right context </s>, the second word in the vocabulary. The value of the second entry is zero because </s> is not the context for any rightmost words. Each time the rightmost word changes, a new key is calculated and the appropriate counter in the right diversity vector is incremented.

The generated rightmost word vector and right diversity vector define the trie structure. The key value of each n-gram is indexed in the rightmost word vector. Consequently, the two vectors can be traversed to find the key value corresponding to a particular n-gram. The operation of looking up a particular key for a given n-gram is discussed in greater detail below.

The system optionally shards 406 the trie. The trie can be sharded as part of the language model such that the integer values of the vectors making of the trie are stored on a number of different machines. When looking up a key for a particular n-gram, the search can be limited to a particular shard machine that includes the integer key values and their corresponding n-grams.

The system can traverse the integer trie to identify the index of a particular n-gram. In particular, the system performs a sequence of n−1 binary searches over ranges of the rightmost vector whose boundaries are specified by the cumulative diversity values. Thus, instead of storing the right diversity vector, a cumulative right diversity (acc) vector can be stored instead. The first entry in the cumulative right diversity vector is set equal to the vocabulary size |V|, thus, acc[0]=|V|. The index assigned to a given n-gram $w_1, \ldots, w_n$ is the index of the last word $w_n$ in the rightmost word vector traversal. In particular, the cumulative right diversity adds the entries in the diversity vector as it is traversed from left-to-right, e.g., 1_2_3 becomes 1_3_6.

Listing the future words in a given n-gram context includes pointing to a corresponding range in the rightmost word vector. The integer trie provides a dense mapping from n-grams to integer values in the range [0, N−1] where N is the total number of n-grams in the language model. Additionally, the integer trie structure allows storing of the probability values (e.g., n-gram probabilities and back-off weights) as arrays of float, or b-bit integers if quantized as described below. An inverse mapping from a given integer key to an n-gram involves binary searching over sorted ranges of the cumulative right diversity vector where the ranges have a size corresponding to the number of n-grams at a given order.

The language model probabilities (e.g., log probability for n-grams in the language model) and back-off weights can be quantized to reduce storage space in the language model. For example, an 8-bit linear quantization can be used for the probability and back-off weight values to compute a separate "codebook" for each. A first pass calculates minimum and maximum values after which each value is represented by its nearest of the codewords (e.g., 256 8-bit codewords) that span a particular [min, max] range.

The integer trie requires storing two entries for each n-gram, one for the rightmost word and one for the diversity count. In some implementations, prior to compression, the integer trie stores each n-gram using a 32-bit integer for each n-gram in the vocabulary. Additionally, the two float values for each n-gram increases the storage requirements. However, since the highest order n-grams do not have a cumulative right diversity vector entry or back-off weight, the actual storage is smaller depending on the ratio of n-grams at the maximum order relative to the total number of n-grams in the language model.

Block compression techniques can be used to compress the integer trie. In particular, the two vectors can contain runs of identical numbers. The rightmost word vector contains entries that are stored within a sub-range. Similarly, the cumulative right diversity vector can be represented by storing the smaller diversity values, which are also likely to occur in runs of identical values. These regularities in the integer trie structure can be exploited using different block-compression techniques.

Three block compression techniques are discussed in detail below. However, regardless of the technique, the resultant compact array provides efficient integer trie lookup (e.g., traversal to identify a particular n-gram). In particular, each compact array provides for lookup actions including obtaining a block length, obtaining an array element at index k, obtaining array elements in a range [start, end), and finding range [$v_{start}$, $v_{end}$) of values equal to a specified v within a pre-specified range [start, end) where the range [start, end) is assumed to be sorted. Specifically, each integer trie is defined as an array A of 32-bit unsigned integers having a block length b. Each of the alternative block compression techniques described below generate a byte-array representation Â.

Figure 5:
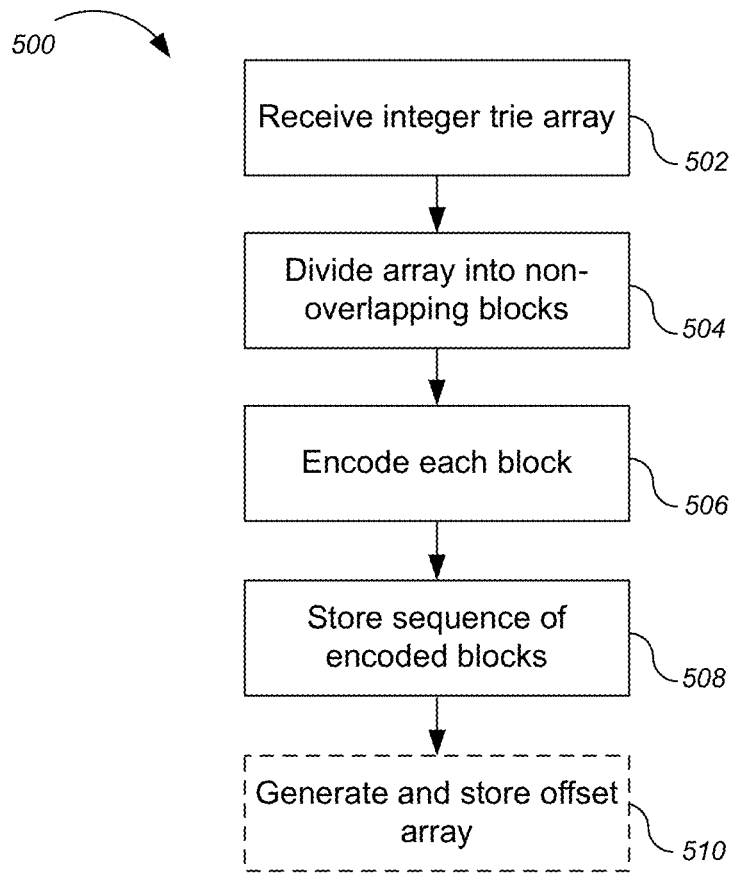
FIG. 5 is a flowchart illustrating an example method for performing block compression of an integer trie.

FIG. 5 is a flowchart illustrating an example method 500 for performing block compression of an integer trie. For convenience, the method 500 will be described with respect to a system that performs the method 500.

The system receives 502 an integer trie array. The system divides 504 the array into a set, B, of non-overlapping blocks, each having a length b. The system encodes 506 each block. In some implementations, a RandomAccess encoding is performed. RandomAccess encoding maintains O(1) access into the encoded array Â. The system encodes each block by storing a first value in the block, referred to as an anchor, e.g., using 4-bytes. The system then stores the difference between the value of each subsequent element in the block and the anchor value using a fixed number β of bytes. For a given block, β is a minimum number of bytes needed to store the difference between the largest (and last) element in the block and the anchor. Maintaining random access during lookup can be performed since the encoding allows the system to compute β for a block by taking the difference between its offset and the following block's offset and dividing by the block size b. In some implementations, the anchor values are cached to allow quick access during binary searching.

In some other implementations, a GroupVar encoding is performed. In the GroupVar encoding, the size of Â decreases as b increases. In particular, the system encodes the blocks using a custom representation of delta-encoded values to improve decoding speed. In particular, not all integer values in the trie need the full 32 bit (4 bytes) range. Many values are small and can be represented on 1, 2 or 3 bytes, respectively. So a group of four integer values that would normally take 4×4 Bytes=16 bytes, can be represented on fewer bytes depending on the values involved. The overhead of storing the length in bytes needed for each of the 4 entries in a group is 2 bits×4 entries in a group=1 byte. The system represents each value as a two-bit length (0-3 indicating 1-4 bytes), plus that many bytes of data. In order to provide fast decoding, the numbers are stored in groups of four as follows:

length tags: 1 byte
value 1: 1-4 bytes
value 2: 1-4 bytes
value 3: 1-4 bytes
value 4: 1-4 bytes where the first byte contains two-bit lengths for the four values. As a result, each group of four values is represented in 5-17 bytes. Because the length tags are all in one byte, a 256 element lookup table can provide appropriate masks and offsets for decoding these four values.

In yet other implementations, a CompressedArray is used to encode the blocks. The system converts each block in the array to a sequence of symbols according to a particular alphabet as follows:

TOGGLE (N): toggle last value's N-th bit
ADD (N): add N to last value
ESCAPE (N): next N bits form the value
REPEAT_LAST (N): last value is repeated for next N index entries
EXPLICIT (N): N is the next value
MRU (N): use the N-th most recent symbol value For example, an ADD(7) increments the last value by seven (e.g., the preceding value in the block). The CompressedArray encoding assumes that the value just before the beginning of each block is zero, thus an ADD(7) to the beginning of a block results in a value of 7.

The system computes a single Huffman code for the entire array and encodes all blocks using the code. The system converts the numbers to symbols by making multiple passes over the input. In the first pass, the system calculates all possible encodings of a value and increments a count associated with each possible encoding. For example, if a value can be encoded as ADD(1) or TOGGLE(1), the system increments the counts for those symbols. In some implementations, the counts are maintained probabilistically. Following the pass, the system builds a Huffman table from the counts.

Over a specified number of additional passes, the system refines the count distribution. In particular, for each value the system selects the minimum length encoding using the Huffman table built from the previous pass. For example, if the Huffman table assigned a smaller code to ADD(1) than to TOGGLE(1), the system increments the count for ADD(1) in the current pass. At the end of each pass, a new Huffman table is built with the new count distribution. In the final pass, the system encodes the values using the Huffman table generated by the previous pass.

The system stores 508 the sequence of encoded blocks. The system optionally generates 510 and stores an offset array. The offset array maps block numbers to a beginning of the corresponding encoded block. A lookup for a compressed integer trie includes computing a block number, looking up the block offset, and identifying and decoding the appropriate entry in the block.

As described above, in some implementations, the language model is sharded. Sharding separates the n-grams of the language model in a distributed system. In some implementations, the sharding is performed such that if an n-gram is not found in a shard, the backed off content can be found without searching a different shard. For example, if a 3-gram "the black sheep" is not found in a particular shard, the 2-gram "the black" can be found in the shard. Consequently, some entries of the language model can be duplicated on multiple shards in order that a search for n-gram back-off values can be performed without changing shards when the whole n-gram is not found.

One sharding technique is context sharding. Context sharding can be implemented to satisfy one or more of three primary goals. A first goal is to facilitate requests for future word probabilities given a context, p(w|context). That is, the probability for any future word having the same context can be calculated using a single shard containing the context. A second goal is to perform all back-off calculations within the same shard. A third goal is to have all shards be substantially the same size.

The first goal can be satisfied by sharding according to the context of the n-grams in the language model. For example, a hash function applied to the language model can be based on the context, hash(context).

However, to also satisfy the second goal, additional operations are performed. Instead of sharding the entire context, sharding is performed on the last word of the context only. Additionally, the empty context (i.e., the 1-grams) are duplicated on all shards. This allows for a back-off from a 2-gram to a 1-gram within each shard for any 2-gram.

A sharding function identifies which shard to access when retrieving a particular n-gram. One example sharding function first identifies if the context has a length greater than one. If the length of the context is greater than one, the sharding function returns a hash value for the last word in the context. If the length of the context is not greater than one, the sharding function returns a hash value for the full context. The hash value identifies the shard containing the particular n-gram. An example sharding function can be written as:

```
sharding_function(context, w):
    if length(context) > 1
        return hash(context_{-(n-2)}) % num_shards // last word
    else
        return hash(context) % num_shards
```

A corresponding distribution function is used to identify which shard or shards should store a particular n-gram. According to the distribution faction, if the context is equal to zero (e.g., 1-gram), than all shards are returned (i.e., the 1-gram is stored on every shard). Otherwise, a single shard is returned corresponding to the sharding function applied to the n-gram. An example distribution function can be written as:

```
distribution_function(context, w):
    if length(context) == 0
        return {0 .. num_shards-1} //all shards
    else
        return {sharding_function(context, w)} //one shard only
```

Satisfying the third goal also requires additional processing. For example, with the above sharding function, the shards tend to be unbalanced. This is due to very frequent words (e.g., "or" or punctuation, e.g., ".") occurring in a very large number of n-grams. As a result the shards containing those words tend to be much larger than an average shard.

One technique for balancing the shard sizes is to shard the last two words of the context instead of only the last word. However, this requires duplicating all 2-grams in addition to the 1-grams in each shard to satisfy the single shard back-off requirement.

An alternative technique for balancing shard sizes is to split large shards into multiple shards such that the resulting shards substantially correspond to an average shard size.

An example balanced sharding function identifies a shard identifier as equal to the sharding function for an n-gram. If the length of a context is greater than one and the shard identifier is in a set of outlier shards, the shard is split. An outlier shard can be a shard having a size greater than a threshold amount (e.g., some percentage larger than average shard size). Outlier shards can be identified, for example, by generating all shards and determining their size. Alternatively, a preprocessing can be performed that does not generate shards, but instead identifies the number of entries that would go into each shard. The split shard identifier is equal to the hash of the last two words of the context (or in some implementations using additional words of the context). If the split identifier is greater than zero, the shard identifier is equal to a base shard identifier added to a split identifier −1. An example balanced sharding function can be written as:

```
balanced_sharding_function(context, w):
    shard_id = sharding_function(context, w)
    if length(context) > 1 and shard_id in set of outlier shards
        split_id = hash(context_{-(n-2) .. -(n-3)}) % num_splits(shard_id) //last 2 words
        if split_id > 0
            shard_id = extra_shard_id_base(shard_id) + split_id−1
    return shard_id
```

If an n-gram falls within an outlier shard, then the system determines which of the split shards should be used according to a hash function of the last two words in the context. The num_splits(shard_id) is the number of splits used for the particular outlier shards. If a selected split identifier is 0, then the original shard identifier is used. Otherwise, the system uses one of the extra shards assigned to the original shard identifier.

The balanced sharding function results in an increased number of shards, but the resulting shards are more evenly sized.

When using the balanced sharding function, the 2-grams of the outlier shards are duplicated across all corresponding splits (i.e., 2-grams in the shard need to be duplicated in each split shard). An example balanced distribution function can be written as:

```
balanced_distribution_function(context, w):
    if length(context) == 0
        return {0 .. num_balanced_shards-1} //all shards
    shard_id = sharding_function(context, w)
    if shard_id in set of outlier shards and length(context) == 1
        return {shard_id, extra_shard_id_base(shard_id) ..
```

```
        extra_shard_id_base(shard_id) + num_splits(shard_id)
    else if shard_id in set of outlier shards and
length(context) > 1
        return {balanced_sharding_function(context, w)} //a
particular split
    else
        return {shard_id} //a particular shard
```

In some implementations, shards that are still large relative to the average shard size are further split in a similar manner by taking the last three words of the context into account.

Another sharding technique is restricted context sharding. Restricted context sharding always shards on the last two words of the context. In restricted context sharding, 1-grams are duplicated on all shards and some 2-grams are duplicated. Not all back-off operations can be processed in the same shard in restricted context sharding. However, back-off can always be done within the same shard for all contexts that occurred in the training data.

A set, C, of all contexts occurring in the language model is represented by:

C={context: there exists (context, w) in the LM}.

The context can have any length from 0 to n−1, where n is the size of a given n-gram. The back-off context is represented by (context_{−k}) derived from a given context after k back-offs. For example, for the context "the black", context_{−1} is "black". Therefore, the context is represented as: context_{0}. Additionally, the empty context, where the back-off has resulted in just a 1-gram, is represented as: context_{−(n−1)}.

The set C is split into k mutually disjoint sets using a sharding function that takes as an argument the identity of (context_{−n+3}), which represents the last two words of the context. The whole context is used if it is less than two words in length.

The restricted context sharding model can be written as:

```
for every n-gram (context, w) in our language model:
    * identify shard s = restricted_sharding_function
(context_{-n+3} //last two words of context
        * for o = 0; o<n; ++o
            -write context_{-(n-1)+o} and BOW(context_{-(n-1)+o}) to
shard s
            -for all w seen in context_{-(n-1)+o}
                # write (context_{-(n-1)+o}, w) and
P(w|context_{-(n-1)+o}) to shard s
```

In the integer trie representation of the language model, information is written incrementally to the model. For example, writing the BOW for a given context is provided for in the model by:

write context_{−(n−1)+o} and BOW (context_{−(n−1)+o}) to shard s.

Additionally, probabilities for future words, w, in a given context, are provided in the model by:

write (context_{−(n−1)+o}, w) and p(w|context_{−(n−1)+o}) to shard s.

All shards do not necessarily share all 1-grams and 2-grams. There may be words z for which all continuations result in the sharding function picking only a subset of shards and avoiding other shards entirely. For example, define a set Z(s) is defined by: Z(s)={z: there exists context (c, z) in the language model such that sharding function(c z)==s}. If this set is smaller than the whole vocabulary, then we have identified 2-grams (c z) that do not be stored on shard s.

In this model, an example restricted sharding function is provided by:

```
restricted_sharding_function(context, w):
    if length (context) > 2
        return hash(context_{-(n-2) . . -(n-3)}) % num_shards
//last two words
    else
        return hash(context) % num_shards
```

Additionally, an example restricted distribution function is:

```
restricted_distribution_function(context, w):
    if length (context) == 0
        return {0 . . num_shards-1} //all shards
    else if length (context) == 1
        //set of all shards that contain a longer context ending
in the current context
        return {s : exists context* such that contex*_{-(n-2)} =
context and s = restricted_sharding_function (context, w)
    else
        return restricted_sharding_function (context, w)
```

All of the shards returned by the restricted sharding function receive the corresponding probability, p(w|context), and context back-off weight, BOW (context) data. Each shard can then be encoded according to one of the block encoding techniques described above.

Figure 6:
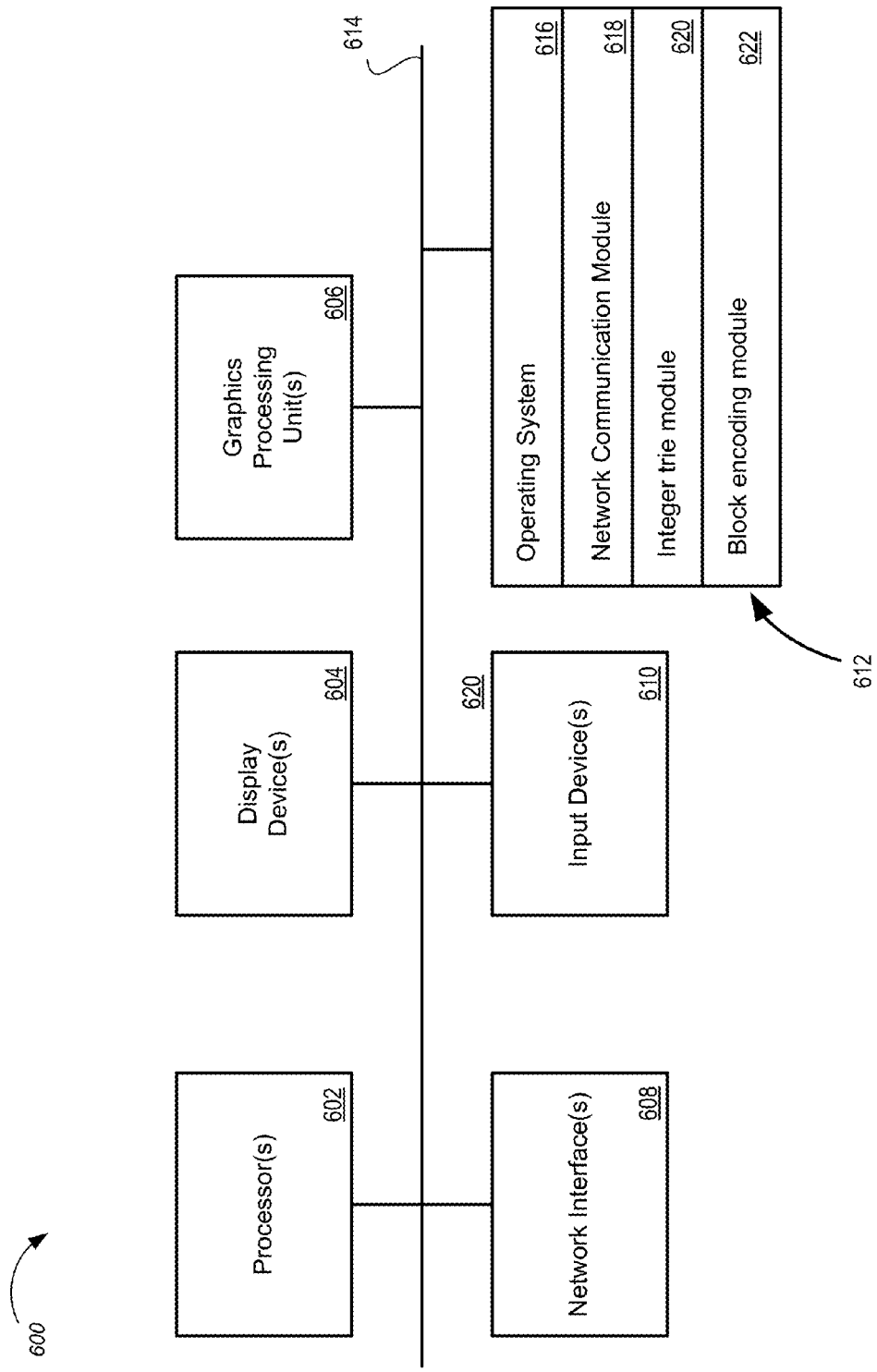
FIG. 6 illustrates an example system architecture.

FIG. 6 illustrates an example system architecture 600. The system architecture 600 is capable of performing operations for grouping image search results. The system architecture 600 includes one or more processors 602 (e.g., IBM PowerPC, Intel Pentium 4, etc.), one or more display devices 604 (e.g., CRT, LCD), graphics processing units 606 (e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data using one or more buses 614 (e.g., EISA, PCI, PCI Express, etc.).

The term "computer-readable medium" refers to any medium that participates in providing instructions to a processor 602 for execution. The computer-readable medium 412 further includes an operating system 616 (e.g., Mac OS®, Windows®, Linux, etc.), a network communication module 618, integer trie module 620, and block encoding module 622.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.).

The integer trie module 620 provides various software components for performing the various functions for generating an integer trie representation of a language model as described with respect to FIGS. 1-5. The block encoding module 622 provides various software components for performing the various functions for encoding an integer trie representation of a language model as described with respect to FIGS. 1-5.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    obtaining, at a computing system including one or more processors, a language model including (i) a plurality of n-grams from a corpus, (ii) a relative frequency for each of the plurality of n-grams, and (iii) a back-off weight for each of the plurality of n-grams;
    generating, at the computing system, a modified language model, the modified language model being smaller than the language model, the modified language model being a trie representation of the language model, wherein generating the modified language model includes:
        sorting, at the computing system, the plurality of n-grams according to a sorting technique to obtain a sorted plurality of n-grams, wherein the sorting technique is one of:
            (a) a direct full n-gram sort that sorts the plurality of n-grams in a direct traversal order from a left-most word to a right-most word to obtain the sorted plurality of n-grams,
            (b) a reversed full n-gram sort that sorts the plurality of n-grams in a reverse traversal order from a right-most word to a left-most word to obtain the sorted plurality of n-grams,
            (c) a reversed context n-gram sort that sorts a context in a reverse traversal order from a right-most word to a left-most word and then sorts a future word within the same context to obtain the sorted plurality of n-grams, and
            (d) a combined reversed full n-gram sort that (i) sorts the plurality of n-grams from shortest n-gram to longest n-gram to obtain the sorted plurality of n-grams and (ii) identifies and inserts missing n-grams into the modified language model,
        encoding, at the computing system, the sorted plurality of n-grams using an encoding technique to obtain an array comprising a plurality of vectors, respectively, wherein a specific vector includes one or more keys values corresponding to one or more of the plurality of n-grams, and
        generating, at the computing system, the trie representation of the language model using the array to obtain the modified language model; and
    outputting, at the computing system, a probability for an n-gram in response to a request using the modified language model, wherein the probability is based on relative frequencies and back-off weights for any of the plurality of n-grams that are associated with a key value for the n-gram.

2. The computer-implemented method of claim 1, further comprising:
    receiving, at the computing system, one or more new n-grams; and
    modifying, at the computing system, the modified language model by identifying data for the one or more new n-grams and only adding incremental data to any of the plurality of vectors.

3. The computer-implemented method of claim 1, further comprising dividing, at the computing system, the trie into one or more shards using a sharding technique.

4. The computer-implemented method of claim 3, wherein the sharding technique is context sharding, and wherein each of one or more n-grams in a specific shard has a same context.

5. The computer-implemented method of claim 3, wherein the sharding technique is restricted context sharding, and wherein each of one or more n-grams in a specific shard has a same last two words of a context.

6. The computer-implemented method of claim 3, wherein the sharding technique is a balanced sharding technique, and wherein each of the one or more shards is approximately a same size.

7. The computer-implemented method of claim 1, wherein the encoding technique is a non-overlapping block encoding technique, and wherein the non-overlapping block encoding technique includes:
    dividing, at the computing system, the trie into a set of B non-overlapping blocks, each of the B non-overlapping blocks having a length b, wherein B and b are integers greater than zero; and encoding, at the computing system, each of the B non-overlapping blocks into an array A by:
  storing an anchor value in a specific block, the anchor value representing a first value in the specific block;
  storing a difference between a value of each subsequent element in the specific block and the anchor value using a fixed number of bytes β, wherein β represents a minimum number of bytes needed to store the different between a largest, last element in the block and the anchor value.

8. The computer-implemented method of claim 1, wherein the encoding technique is a GroupVar block encoding technique, and wherein the GroupVar block encoding technique includes:
  dividing, at the computing system, the trie into a set of B blocks, each of the B blocks having a length b, wherein B and b are integers greater than zero; and
  encoding, at the computing system, each of the B blocks into an array A such that a size of the array A decreases as the length b increases.

9. The computer-implemented method of claim 1, wherein the encoding technique is a CompressedArray block encoding technique, and wherein the CompressedArray block encoding technique includes:
  dividing, at the computing system, the trie into a set of B blocks, each of the B blocks having a length b, wherein B and b are integers greater than zero;
  converting, at the computing system, each of the B blocks into a sequence of symbols according to a particular alphabet using a single Huffman code to obtain a Huffman table; and
  encoding, at the computing system, values using the Huffman table to obtain a sequence of encoded blocks.

10. A computing system including one or more processors configured to perform operations comprising:
  obtaining a language model including (i) a plurality of n-grams from a corpus, (ii) a relative frequency for each of the plurality of n-grams, and (iii) a back-off weight for each of the plurality of n-grams;
  generating a modified language model, the modified language model being smaller than the language model, the modified language model being a trie representation of the language model, wherein generating the modified language model includes:
    sorting the plurality of n-grams according to a sorting technique to obtain a sorted plurality of n-grams, wherein the sorting technique is one of:
      (a) a direct full n-gram sort that sorts the plurality of n-grams in a direct traversal order from a left-most word to a right-most word to obtain the sorted plurality of n-grams,
      (b) a reversed full n-gram sort that sorts the plurality of n-grams in a reverse traversal order from a right-most word to a left-most word to obtain the sorted plurality of n-grams,
      (c) a reversed context n-gram sort that sorts a context in a reverse traversal order from a right-most word to a left-most word and then sorts a future word within the same context to obtain the sorted plurality of n-grams, and
      (d) a combined reversed full n-gram sort that (i) sorts the plurality of n-grams from shortest n-gram to longest n-gram to obtain the sorted plurality of n-grams and (ii) identifies and inserts missing n-grams into the modified language model,
    encoding the sorted plurality of n-grams using an encoding technique to obtain an array comprising a plurality of vectors, respectively, wherein a specific vector includes one or more keys values corresponding to one or more of the plurality of n-grams, and
    generating the trie representation of the language model using the array to obtain the modified language model; and
  outputting a probability for an n-gram in response to a request using the modified language model, wherein the probability is based on relative frequencies and back-off weights for any of the plurality of n-grams that are associated with a key value for the n-gram.

11. The computing system of claim 10, wherein the operations further comprise:
  receiving one or more new n-grams; and
  modifying the modified language model by identifying data for the one or more new n-grams and only adding incremental data to any of the plurality of vectors.

12. The computing system of claim 10, wherein the operations further comprise dividing the trie into one or more shards using a sharding technique.

13. The computing system of claim 12, wherein the sharding technique is context sharding, and wherein each of one or more n-grams in a specific shard has a same context.

14. The computing system of claim 12, wherein the sharding technique is restricted context sharding, and wherein each of one or more n-grams in a specific shard has a same last two words of a context.

15. The computing system of claim 12, wherein the sharding technique is a balanced sharding technique, and wherein each of the one or more shards is approximately a same size.

16. The computing system of claim 10, wherein the encoding technique is a non-overlapping block encoding technique, and wherein the non-overlapping block encoding technique includes:
  dividing the trie into a set of B non-overlapping blocks, each of the B non-overlapping blocks having a length b, wherein B and b are integers greater than zero; and
  encoding each of the B non-overlapping blocks into an array A by:
    storing an anchor value in a specific block, the anchor value representing a first value in the specific block;
    storing a difference between a value of each subsequent element in the specific block and the anchor value using a fixed number of bytes β, wherein β represents a minimum number of bytes needed to store the different between a largest, last element in the block and the anchor value.

17. The computing system of claim 10, wherein the encoding technique is a GroupVar block encoding technique, and wherein the GroupVar block encoding technique includes:
  dividing the trie into a set of B blocks, each of the B blocks having a length b, wherein B and b are integers greater than zero; and
  encoding each of the B blocks into an array A such that a size of the array A decreases as the length b increases.

18. The computing system of claim 10, wherein the encoding technique is a CompressedArray block encoding technique, and wherein the CompressedArray block encoding technique includes:
  dividing the trie into a set of B blocks, each of the B blocks having a length b, wherein B and b are integers greater than zero;
  converting each of the B blocks into a sequence of symbols according to a particular alphabet using a single Huffman code to obtain a Huffman table; and
  encoding values using the Huffman table to obtain a sequence of encoded blocks.

* * * * *